United States Patent [19]

Kawada et al.

[11] 3,869,717

[45] Mar. 4, 1975

[54] MAGNETIC RECORDING AND REPRODUCING APPARATUS FOR MULTI-CHANNEL ENDLESS TAPE

[75] Inventors: Toshio Kawada; Tadashi Torama; Tamio Kobayashi, all of Osaka, Japan

[73] Assignee: Matsushita Electric Industrial Company Limited, Osaka, Japan

[22] Filed: Feb. 6, 1974

[21] Appl. No.: 439,852

Related U.S. Application Data

[63] Continuation-in-part of Ser. No. 260,401, abandoned.

[30] Foreign Application Priority Data

| | | |
|---|---|---|
| June 18, 1971 | Japan | 46-44346 |
| June 18, 1971 | Japan | 46-44347 |
| June 18, 1971 | Japan | 46-44348 |
| June 18, 1971 | Japan | 46-44349 |
| June 18, 1971 | Japan | 46-44350 |

[52] U.S. Cl. ........................ 360/60, 360/71, 360/78, 360/93, 360/106

[51] Int. Cl. G11b 15/04, G11b 23/04, G11b 21/02

[58] Field of Search .......... 360/60, 106, 71, 93, 74, 360/78; 226/181, 199, 198, 90; 242/55.19 A

[56] References Cited

UNITED STATES PATENTS

| | | | |
|---|---|---|---|
| 3,083,269 | 3/1963 | Gaubert | 360/93 |
| 3,196,214 | 7/1965 | Knoth | 360/93 |
| 3,485,500 | 12/1969 | Loeschner et al. | 360/93 |
| 3,492,005 | 1/1970 | Ueno et al. | 360/78 |
| 3,632,897 | 1/1972 | Ban | 360/71 |
| 3,672,685 | 6/1972 | Tolar | 360/106 |

*Primary Examiner*—Alfred H. Eddleman

[57] ABSTRACT

Herein disclosed is an improved magnetic recording and reproducing apparatus for a multi-channel endless magnetic recording tape in the form of cartridge, which can timely eject the cartridge recording tape upon completion of desired recording or reproducing operation, so that, unwanted record or reproduction can be avoided.

4 Claims, 8 Drawing Figures

MAGNETIC RECORDING AND REPRODUCING APPARATUS FOR MULTI-CHANNEL ENDLESS TAPE

This application is a continuation-in-part of the application Ser. No. 260,401, filed on June 7, 1972, and now abandoned.

The present invention relates to a magnetic recording and reproducing apparatus and, more particularly, to a magnetic recording and reproducing apparatus which processes an endless magnetic recording tape in the form of cartridge having a plurality of recording tracks. The specific purpose of the invention is to provide a recording and reproducing apparatus which is useful for magnetically recording multi-channel programs on a multi-track endless tape of cartridge type without double-recording and for magnetically reproducing multi-channel programs carried by a multi-track endless tape of cartridge type.

The invention relates to an improvement in known magnetic recording and reproducing apparatus designed to receive 2-channel and 4-channel tape in a cartridge. In such apparatus there are a plurality of magnetic heads which are disposed in the apparatus to be movable by a head shift plunger so as to confront the tracks of the tape received in the apparatus. Suitable signal processing circuits are associated with the respective heads.

As is also known the apparatus also includes means for ejecting the tape from the apparatus when actuated and means for feeding the tape pass the magnetic heads.

In general the invention involves a plurality of on-off switches which are actuated in accordance with the shape of the tape cartridge received in the apparatus. These switches control the operation of a relay coil with an associated plurality of recording and reproducing switches and a pair of 2-channel 4-channel switching means provided on the output of head output amplifiers. The latter switching means are energized so as to selectively supply the output from the amplifiers.

There are sensing switch means provided in the vicinity of heads for detecting passage of the conductive piece attached at the end of the tracks on the tape. A first solenoid is operated by the sensing means for moving the plurality of heads and a pair of rotary switch means which are selectively operated by the actuation of the second solenoid for selecting predetermined modes of operation of the apparatus.

In addition to the above described, there is another solenoid which is connected to the input of first solenoid for ejecting the tape cartridge when actuated, and an automatic cartridge ejecting switch for energizing this second solenoid and establishing a closed loop through the sensing switch means.

The specific structure of the invention will be understood when the detailed description is read in conjunction with the accompanying drawings in which:

FIG. 1 is an electric circuit according to an embodiment of the invention;

FIG. 2*a* is a side view of a 4-channel cartridge having a groove G on the outer case;

FIG. 2*b* is a plain view of the cartridge of the FIG. 2*a* in which the cartridge sensing switch is not operated or is in a OFF condition;

FIG. 3*a* is a side view of a 2-channel cartridge having no groove on the case;

FIG. 3*b* is a plain view of the cartridge of FIG. 3*a* in which the sensing switch is ON condition;

Figure 1:
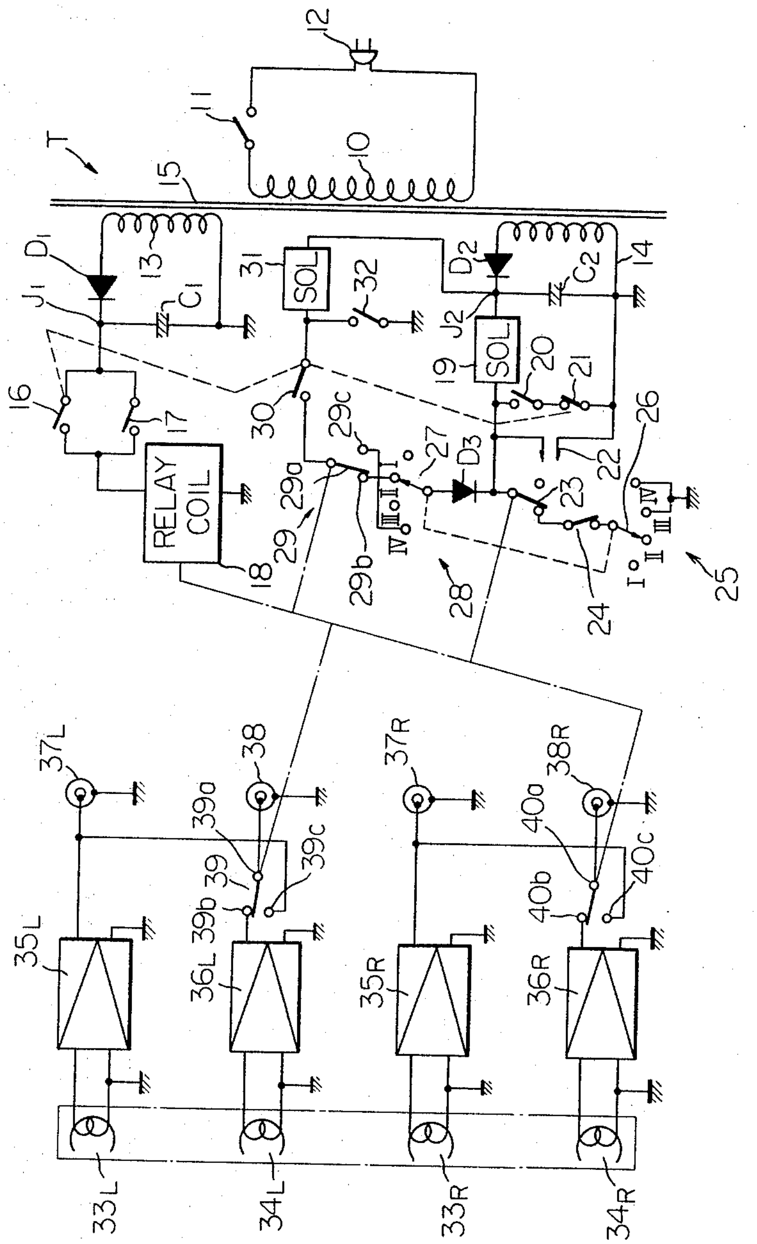

Referring now to the drawings and more specifically to FIG. 1 thereof, there is shown a circuit arrangement according to the invention to be incorporated with a magnetic recording and reproducing apparatus which processes an endless magnetic recording tape in the form of cartridge having a plurality of recording tracks and an electro-conductive piece disposed on a portion thereof. The circuit arrangement of FIG. 1 comprises a transformer T having a primary coil 10 with one terminal connected through a normally-open switch 11 to the terminal of a plug 12 or the like to be connected with an A.C. source and the other terminal connected direct to the other terminal of the plug 12. The switch 11 is adapted to close when the particular circuit is to be operative. The transformer T has secondary coils 13 and 14 which are magnetically coupled with the primary coil 10 through a magnetic core 15 so that when the primary coil 10 is energized by an A.C. power through the plug 12, A.C. voltages analogous to the A.C. power are induced in the secondary coils 13 and 14, respectively. One terminal of the secondary coil 13 is connected to an anode of a diode $D_1$ a cathode of which is connected through a joint $J_1$ to one terminal of a smoothing capacitor $C_1$. The other terminal of the capacitor $C_1$ is connected to the other terminal of the coil 13 and to the ground. The joint $J_1$ is connected through a parallel connection of normally-open first recording switch 16 and a 2-channel detecting switch 17 to one terminal of a relay coil 18. The other terminal of the relay coil 18 is grounded. The switch 16 is adapted to close during recording operation of the apparatus to be incorporated with this circuit and to open during reproducing operation. The switch 17 is actuated to close when 2-channel recording tape is set in the tape holder of the apparatus but is left open when a 4-channel recording tape is set in the tape holder.

Figure 2A:
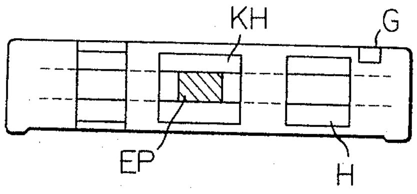
Figure 2B:
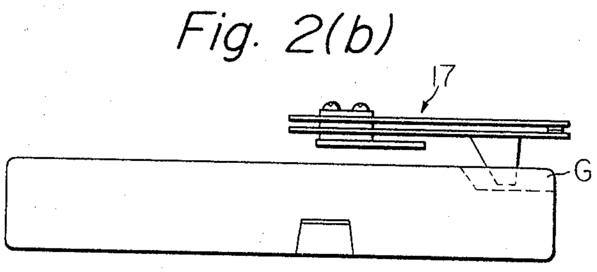

FIG. 2*a* and 2*b* show an outer shape of a 4-channel cartridge which contains therein an endless tape with an electrically conductive piece EP and having a hole KH for a head and other hole H for a pinch roller. In the figures, the switch 17 is not operated when it is inserted in the apparatus because the projection P of FIG. 2*b* is not pressed by the groove G.

Figure 3A:
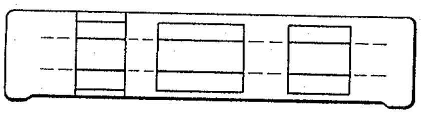
Figure 3B:
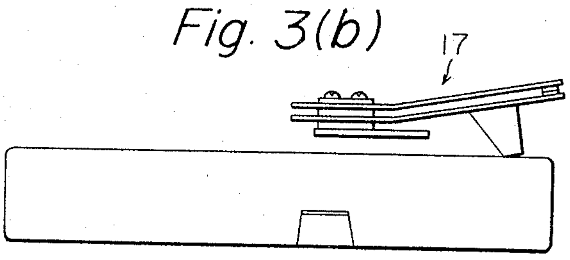

However, as shown in FIG. 3*a* and 3*b*, in the case of the 2-channel cartridge having no groove portion, the switch 17 is pressed by the wall of the cartridge and the switch 17 is rendered contacted condition. This means that the electric circuit of FIG. 1 detects that the 2-channel cartridge is inserted.

Now, let an explanation be returned to the electric circuit of FIG. 1. One terminal of the secondary coil 14 is connected to an anode of a diode $D_2$ a cathode of which is connected through a joint $J_2$ to one terminal of a smoothing capacitor $C_2$. The other terminal of the capacitor $C_2$ is connected to the other terminal of the coil 14 and to the ground. The joint $J_2$ is connected to one terminal of a head shift plunger solenoid 19 which actuates the head shift plunger (not shown) when energized by an electric energy. The head shift plunger shifts step by step a plurality of, in this case, four recording or reproducing heads (not shown) so as to permit the heads to confront one of the tracks of the recording tape set in the apparatus. The other terminal of the solenoid 19 is connected through a series connection of a normally-open manual program change switch 20 and a normally-closed third recording switch 21 to the ground. The switch 20 is manually closed when the recording or reproducing track or channel is intended to change. The switch 21 is, on the other hand, engaged with the first recording switch 16 and accordingly opens when the switch 16 is closed. The switches 20 and 21 are shunted by a sensing switch 22 which is positioned in the proximity of the heads so as to slidably contact onto the surface of the recording tape and accordingly is short-circuited by the electro-conductive piece upon completion of a predetermined feeding of the tape, namely, an intended recording or reproducing operation. The other terminal of the solenoid 19 is further connected through a normally-closed relay switch 23 and an interrupter 24 of a rotary switch 25 to a rotatable contact 26 of the rotary switch 25. The rotary switch 25 has stationary contact I, II, III and IV consecutively arranged in the order named. The contacts III and IV are grounded. The rotatable contact 26 is rotated by the movement of the head shift plunger through a suitable linkage or mechanism (not shown) so that the contact 26 consecutively contacts with the stationary contacts I, II, III and IV. The interrupter 24 is adapted to open its circuit during the transfer of the rotatable contact from one stationary contact to another. The other terminal of the solenoid 19 is connected to an anode of a diode $D_3$ a cathode of which is connected to a rotatable contact 27 of another rotary switch 28. The rotatable contact 27 is engaged with the rotatable contact 26 of the rotary switch 25 so that the contact 26 rotates in synchronism with the contact 26. The rotary switch 28 has four stationary contacts I, II, III and IV which are arranged in the same manner as the stationary contacts of the rotary switch 25. It is to be noted that the stationary contacts I, II, III and IV of the switches 25 and 28 respectively correspond to tracks of the tape or channels of the apparatus and the position of the rotatable contact 26 or 27 corresponds to that of the magnetic heads. The stationary contact II of the switch 28 is connected to one stationary contact 29*b* of a relay switch 29 and, on the other hand, the contact III is connected to the other stationary contact 29*c*. The switches 23 and 29 are associated with the relay coil 18 so that the relay switches 23 and 29 are actuated when the relay coil 18 is energized. A movable contact 29*a* is connected through a normally-open switch 30 to one terminal of a tape eject plunger solenoid 31 which actuates the tape eject plunger when energized. The tape eject plunger ejects the recording tape from the tape holder when actuated. The switch 30 is associated with the switch 16 and accordingly closed when the switch 16 is closed. The one terminal of the solenoid 31 is connected to the ground through a normally-open tape eject switch 32 which is manually closed by the operator when the recording tape is intended to be ejected. The other terminal of the solenoid 31 is connected to the junction $J_2$. The four heads of the apparatus are, in this case, recording and reproducing heads $\mathbf{33}_L$ and $\mathbf{33}_R$, recording heads $\mathbf{34}_L$ and $\mathbf{34}_R$. Two terminals of the heads are connected to two input terminals of each of amplifiers $\mathbf{35}_L$, $\mathbf{36}_L$, $\mathbf{35}_R$ and $\mathbf{36}_R$. The recording and reproducing heads $\mathbf{33}_L$ and $\mathbf{33}_R$ are, on the other hand, respectively connected to circuit arrangements (not shown) which produce audio signal to be recorded on the recording tape during the recording operation of the apparatus. One input terminal of the amplifiers $\mathbf{35}_L$, $\mathbf{35}_R$, $\mathbf{36}_L$ and $\mathbf{36}_R$ are preferably grounded as illustrated. One of output terminals of each of the amplifier $\mathbf{35}_L$ and $\mathbf{35}_R$ is connected direct to one terminal of each of output elements $\mathbf{37}_L$ and $\mathbf{37}_R$. The other output terminal of each of the amplifiers $\mathbf{35}_L$ and $\mathbf{35}_R$ is grounded. The other terminals of the output elements $\mathbf{37}_L$ and $\mathbf{37}_R$ are grounded. One output terminal of the amplifier $\mathbf{36}_L$ is connected to a break stationary contact 39*b* of a relay switch 39 which is associated with the relay coil 18. A make stationary contact 39*c* of the switch 39 is connected to the one terminal of the output element $\mathbf{37}_L$. A movable contact 39*a* of the switch 39 is connected to one terminal of an output element $\mathbf{38}_L$ the other terminal of which is grounded. One output terminal of the amplifier $\mathbf{36}_R$ is connected to a break stationary contact 40*b* of a relay switch 40 which is associated with the relay coil 18. The other output terminal of the amplifier $\mathbf{36}_R$ is grounded. The relay switch 40 further has a make stationary contact 40*c* connected to the one terminal of the output element $\mathbf{37}_R$ and a movable contact 40*a* connected to one terminal of an output element $\mathbf{38}_R$. The other terminal of the output element $\mathbf{38}_R$ is grounded. A multi-channel signal processing circuit (not shown) is connected to the output elements $\mathbf{37}_L$, $\mathbf{37}_R$, $\mathbf{38}_L$ and $\mathbf{38}_R$ so as to convert the signals from the amplifiers $\mathbf{33}_L$, $\mathbf{33}_R$, $\mathbf{34}_L$ and $\mathbf{34}_R$ into desired signals. The output elements $\mathbf{37}_L$ corresponds to the front left channel and output element $\mathbf{37}_R$ corresponds to the front right channel. The output elements $\mathbf{38}_L$ and $\mathbf{38}_R$ correspond to the left and right back channels, respectively.

When, in operation, the apparatus is intended to carry out the reproducing operation and a 2-channel endless recording tape of a cartridge type is set in the tape holder, the first recording switch 16 is held to open and the 2-channel switch 17 is actuated to close through, for example, a mechanical linkage operable by a pressure caused by the setting of the tape. The switch 11 is at the same time closed so that the A.C. energy through the plug 12 energizes the primary coil 10 whereby A.C. voltages are induced in the secondary coils 13 and 14. The A.C. voltage generated in the coil 13 is rectified by the diode $D_1$ and smoothed by the capacitor $C_1$ and, thereupon, delivered through the closed switch 17 to the relay coil 18. The relay coil 18 accordingly actuates the associated switches 23, 29, 39 and 40 the movable contacts 23*a*, 29*a*, 39*a* and 40*a* of which then connect with make stationary contacts 23*c*, 29*c*, 39*c* and 40*c*, respectively. The recording tape set in the holder is, on the other hand, fed by a feeding means (not shown) of the apparatus and one of 2-channel programs recorded on the tape is picked up by the heads $\mathbf{33}_L$, $\mathbf{34}_L$, $\mathbf{33}_R$ and $\mathbf{34}_R$. The picked up program is amplified by the amplifiers and appears on the output terminals of the amplifiers. Since, in this instance, the movable contacts 39*a* and 40*a* are slanted to *c* sides, the output signals from the amplifier $\mathbf{35}_L$ and $\mathbf{35}_R$ are delivered to the output elements $\mathbf{37}_L$ and $\mathbf{38}_L$, and $\mathbf{37}_R$ and $\mathbf{38}_R$, respectively, and the output signals from the amplifiers $\mathbf{36}_L$ and $\mathbf{36}_R$ are not utilized. When, in this instance, the movable contacts 26 and 27 of the rotary switches 25 and 28 connect with the stationary contact II as illustrated, the programs recorded on the second track is reproduced. When the reproduction of the program on the second track is completed, the electro-conductive piece which is attached at the end of tape, which is, for instance, the one shown in the U.S. Pat. No. 3,632,897, passes in the proximity of the heads and short-circuits the sensing switch 22. Since, on the other hand, the A.C. voltage induced in the secondary coil 14 is converted by the diode $D_2$ and the smoothing capacitor $C_2$ into a D.C. voltage which appears at the joint $J_2$, the solenoid 19 is energized by a current from the junction $J_2$ through the solenoid 19 and the sensing switch 22 to the ground with the result that the heads $33_L$, $33_R$, $34_L$ and $34_R$ are shifted by the head shift plunger from the second to the third track and at the same time the rotatable contacts 26 and 27 are transferred from the contacts II to the contacts III. Thus, the reproducing of the program recorded on the third track is carried out until the electro-conductive piece again contacts with the sensing switch 22. It is to be noted that the operation of the interrupter 24 is ineffective since the switch 23 is open. When the sensing switch 22 is again short-circuited, the solenoid 19 is energized so that the heads are shifted to the fourth track and the rotatable contacts 26 and 27 are respectively shifted from the contact III to IV. As long as the particular condition is held, the same operation as above-stated is repeated whereby the programs recorded on the tracks of the tape are consecutively reproduced. When, on the other hand, it is desired to manually change the program to be reproduced, the manual program change switch 20 is manually actuated so that the solenoid 19 is energized to shift heads and the rotatable contacts 26 and 27 because the recording switch 21 is closed. When it is desired to eject the recording tape from the tape holder, the tape eject switch 32 is manually closed to energize the tape eject plunger solenoid 31.

When it is intended to record a certain program on a 2-channel recording tape of cartridge type, the switches 16 and 30 are closed and the recording switch 21 is opened. The relay coil 18 is therefore energized so tht the relay switches 23, 29, 39 and 40 are actuated and accordingly the shifting of the heads is performed in the same manner as the reproduction operation. On the other hand, programs to be recorded on the 2-channel recording tape are applied to the recording and reproducing heads $33_L$ and $33_R$. When, in this instance, the recording on the fourth track is completed and the sensing switch 22 is short-circuited by the conductive piece, the tape eject plunger solenoid 31 is energized by a current flowing from the junction $J_2$ through the solenoid 31, the switch 30, the stationary contact 29*c*, the contact IV of the switch 28, the diode $D_3$ and the sensing switch 22 to the ground whereby the recording tape is automatically ejected from the holder. This particular automatic ejection operation is desirable to avoid unwanted double-recording. It will be now understood that the manual change of the track or program by closing the manual program change switch 20 is impossible since the switch 21 is open. It is now to be understood that the diode $D_3$ is effective for preventing a current from flowing from the joint $J_2$ through the solenoid 19, rotary switch 28, the switch 30 and the switch 32 to the ground to energize the solenoid 19 when the switch 32 is manually closed in order to eject the recording tape from the holder. Therefore, the heads of the apparatus are retained pending the succeeding recording operation even if the recording operation is stopped before completion of recording.

When it is intended to reproducing programs recording switches 16 and 30 are allowed to open and the switch 21 is closed and the switch 17 is allowed to open, so that, relay coil 18 is not energized whereby the movable contacts of the relay switches 23, 29, 39 and 40 connects with the break stationary contacts. It is to be understood that the 4-channel recording tape carries two programs which are respectively recorded on two of the four tracks. First one of the programs is picked up by the heads $33_L$, $33_R$, $34_L$ and $34_R$ and amplified by the amplifier $35_L$, $35_R$, $36_L$ and $36_R$. Since the relay switches 39 and 40 are not actuated, the amplified signal form the amplifiers are respectively delivered to the output elements $37_L$, $37_R$, $38_L$ and $38_R$ and processed by the signal processing circuit. Upon completion of reproducing the first program, the sensing switch 22 is short-circuited by the conductive piece with the result that the head shift plunger solenoid 19 is energized by a current through the sensing switch 22 and the switch 21. Thus, the heads are shifted to confront the tracks containing the second program and the rotatable contacts 26 and 27 transfer from the contacts I to II. When the reproduction of the second program is completed the sensing switch 22 is again short-circuited by the conductive piece, the solenoid 19 is energized to shift the heads and transfer the rotatable contact 26 from the contact II to III. Since the interrupter 24 returns and the contact III is grounded, a current flows from the joint $J_2$ through the solenoid 19, the switch 23, the interrupter 24, the rotatable contact 26 and the contact III of the switch 25 to the ground thereby causing the solenoid 19 to be energized and to shift the rotatable contacts 26 and 27 from the contact III to IV. Upon completion of the shift of the rotatable contact 26 the interrupter 24 returns to close its circuit, the solenoid is again energized since the contact IV of the switch 25 is grounded. As a result, the rotatable contacts 26 and 27 are shifted from the contacts IV to the contacts I and the heads are shifted to confront the track corresponding to first program. Therefore, it is again commenced to reproduce the first program recorded on the recording tape. When, in this instance, the recording switches 16, 20 and 30 are actuated to make the apparatus carries out 2-channel recording in the same manner as when the 2-channel tape is set in the holder. A circuit arrangement may be incorporated with the particular circuit, which makes the switches 16, 21 and 30 inoperative when the switch 17 opens.

Figures 4, 5:
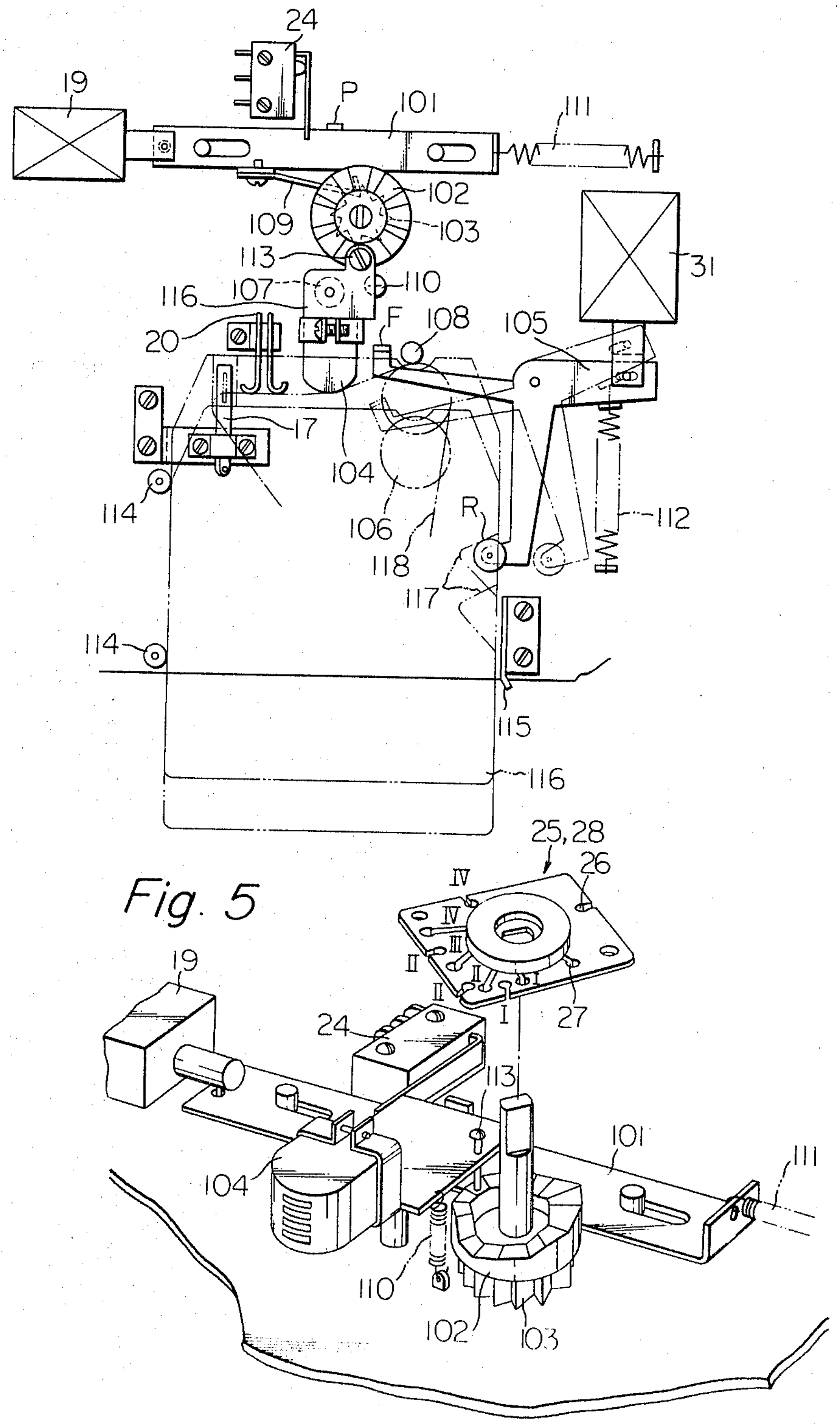
FIG. 4 is a mechanical structure in connection with the electrical circuit of FIG. 3 according to the present invention.
FIG. 5 is a perspective view of part of the structure of FIG. 4.

FIGS. 4 and 5 show a part of mechanical structure necessary for explaining the electrical circuit of FIG. 4 in which same numerals such as 17, 19, 20, 24 and 31 which correspond to FIG. 1 are used in the figures. The structure comprises plunger 19, switch 24, lever 101, head moving cam 102 with the latch 103, plunger 31, head mechanism 104, ejecting and a holding lever 105 with roller R, pinch roller 106, head guide shaft 107 which moves the head mechanism along the shaft, capstan 108, bar spring 109 which rotates the latch 103 in the clockwise direction when the lever returns, spring 110, 111, and 112, cam contact pin 113, guide pins 114, guide plate 115 and head plate 116. Numeral 117 shows a cartridge having a recess 118, tape 119. The rotary switches 25, 28 comprise movable arms 26, 27, upper contacts I, II, III, IV as well as the lower contacts I, II, III, IV corresponding to those shown in FIG. 1.

In operation, when a cartridge is not inserted in the apparatus, the ejection and holding lever 105 is in the position shown by the solid line. However, when either a 2-channel or a 4-channel cartridge 116 is inserted in the apparatus, the roller R mounted on the lever 105 is pushed to the right and the lever 105 is rotated in the counterwise direction against the spring 112. As a result of this movement, when the roller is fallen in the recess 117 of the cartridge, the cartridge is held securely. Accordingly, the sensing switch (not shown) contacts with the tape contained in the cartridge, while the capstan 108 and the pinch roller 106 are pressed each other through the tape. In this case, erected portion F of the ejection lever is slightly separated from the edge portion of inserted cartridge. At this time, 2-channel, 4-channel cartridge detection switch 17 is set or unset in accordance with the shape of the cartridge used.

In this condition, when the tape begins to run and the sensing switch 22 is short-circuited by the electrically conductive piece EP, the plunger 19 is operated and the lever 101 is moved to the left. As a result, the cam rotates a one-sixteenth revolution and the head mechanism 104 is moved upwards or downwards along the shaft 107, so that recording tracks are exchanged by this action. The change of the tracks causes also the switch 20 to close. The switch 24 is opened by the projection P when the lever 101 is moved to the left by the actuation of the plunger 19. The switch 24 is closed when the lever returns to the original position due to the disengagement of the projection P with the switch. This causes the plunger 19 to be prevented from the holding condition as a result of the energization when the arm 26 of the rotary switch 25 is contacted to the contacts III and IV, so that the switch is again closed when the plunger 19 returns and the projection is disengaged with the switch, and in turn, the plunger 19 is again energized.

Thus, only the recording and reproducing operation of the programs 1 and 2 take place with respect to the 4-channel cartridge, and the head positions corresponding to the programs 3 and 4 with respect to the 2-channel cartridge are skipped, as there are no head positions corresponding to the programs 3 and 4 of the 2-channel cartridge because in this case the four tracks are used out of the eight tracks by a single program in the 4-channel cartridge. In the case of 4-channel, the movement of the head takes, in principle, two steps, while that of the 2-channel takes four steps.

In the recording operation, the plunger 31 automatically begins to operate in the final program, and this allows the ejection lever 105 to rotate counterclockwise, with result that the cartridge is ejected by the projection on the lever. At this time, the roller R removes from the recess 117.

In FIG. 5, the head mechanism 104 is reciprocated once upwards and downwards by the angular rotation of 180°, so that it follows that the head mechanism can be reciprocated twice by every rotation of the cam.

Figure 6:
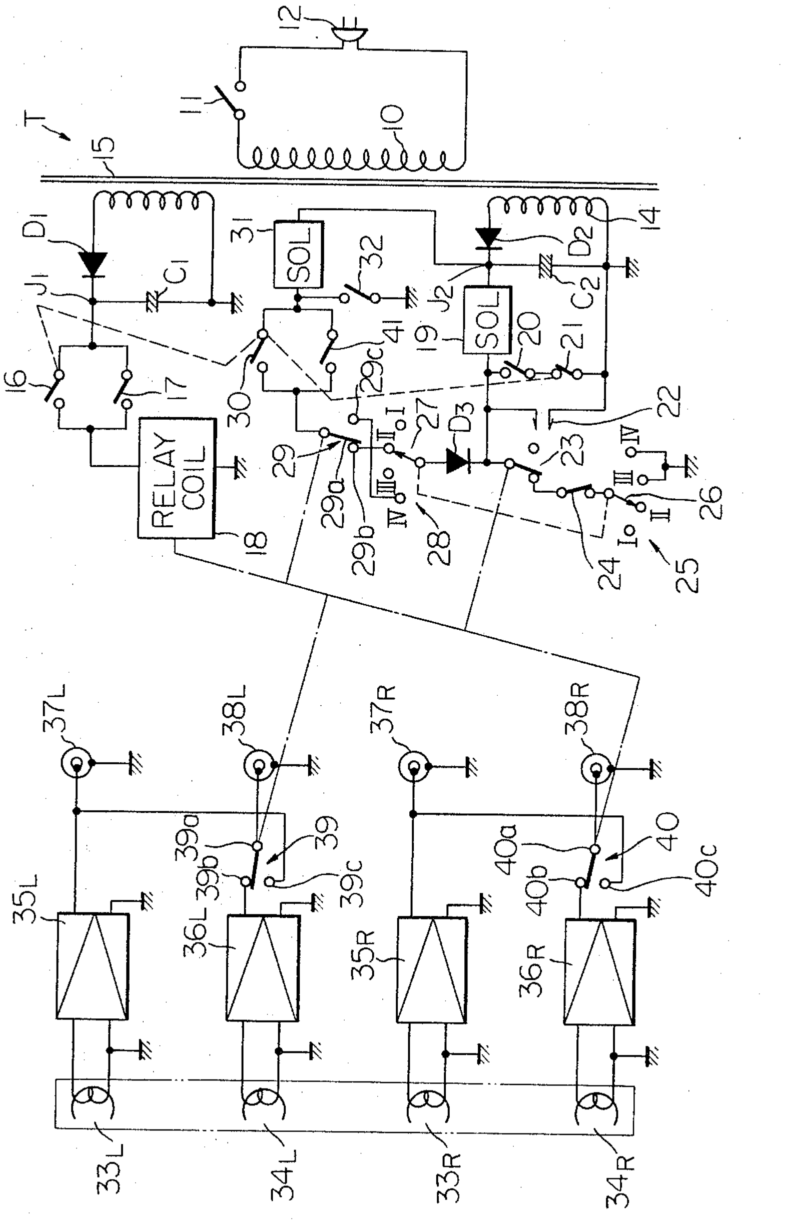
FIG. 6 is a diagram showing another embodiment of the invention.

In FIG. 6, another circuit arrangement according to the invention is shown, which has the same construction except that an eject selecting switch 41 shunts the switch 30. The eject selecting switch 41 is closed when it is desired to eject the recording tape upon completion of reproduction of the last program. When, namely, the switch 41 is closed and the sensing switch is closed by means of the conductive piece, the tape eject solenoid 31 is energized by a current flowing through the contact I or IV of the rotary switch 28. It is to be understood that the diode $d_3$ is also effective for preventing a current from flowing from the joint $J_2$ through the solenoid 19, the rotary switch 28, the switch 29, the switch 41 and the switch 32 to the ground when the switch 32 is manually closed in order to eject the recording tape.

It is apparent from the above description that the apparatus of the invention can record programs on a recording tape having a plurality of tracks without unwanted double-recording and can favourably reproduce a multi-channel program recorded on a multichannel recording tape.

Furthermore, the apparatus of the invention can automatically eject the recording tape set in the tape holder thereof at desired timing.

It will be understood that the invention is not to be limited to the exact construction shown and described and that various changes and modifications may be made without departing from the spirit and scope of the invention, as defined in the appended claims.

What is claimed is:

1. Magnetic recording and reproducing apparatus for 2-channel 4-channel endless tape in the form of a cartridge which comprises;

first actuating means (18) for exchanging 2-channel 4-channel output, a cassette detection switch 17 selectively operated in accordance with an outer shape of the cassette to be used for controlling operation of said first actuating means, a plurality of integrated recording switches (16, 30, 21) connected in parallel with said switch for controlling said actuating means and for controlling recording operation, a pair of 2-channel 4-channel switching means (39, 40) provided on the output of head output amplifiers and responsive to said switching means so as to supply either 2-channel or 4-channel output, sensing switch means (22) provided in the vicinity of a head mechanism for detecting passage of conductive piece attached at the ends of the tracks of the tape, second actuating means 19 coupled to said head mechanism for moving said head mechanism responsive to said sensing means, a pair of rotary switch means (25, 28) coupled to said second actuating means for performing predetermined modes of operation of the apparatus in cooperation with the condition of sensing switch so as to automatically eject cartridge at the end of either 2-channel or 4-channel tracks, and third actuating means (31) connected to the input of said second actuating means for ejecting the cartridge when actuated, whereby either 4-channel or 2-channel cartridge is automatically ejected at the end of the second program or at the end of the fourth program operation by the detection of the conductive piece thereby preventing double recording.

2. Magnetic recording and reproducing apparatus according to claim 1, wherein said head mechanism is moved to predetermined tracks by the second actuating means 19 coupled thereto every time the conductive piece is detected by said sensing means until the end of either 4-channel or 2-channel tracks comes.

3. Magnetic recording and reproducing apparatus according to claim 1, wherein a manual head-moving switch (20) and one (21) of the recording and reproducing switches are connected in parallel to the sensing switch means.

4. Magnetic recording and reproducing apparatus according to claim 1, wherein an automatic cartridge ejecting switch (41) is provided so as to energize said third actuating means for establishing a closed loop through the sensing switch means.

* * * * *